United States Patent
Pe'er

(10) Patent No.: US 11,822,021 B2
(45) Date of Patent: Nov. 21, 2023

(54) SYSTEM AND METHOD FOR ANALYZING QUALITY CRITERIA OF A RADIATION SPOT

(71) Applicant: ELBIT SYSTEMS ELECTRO-OPTICS ELOP LTD., Rehovot (IL)

(72) Inventor: Idit Pe'er, Ness Ziona (IL)

(73) Assignee: ELBIT SYSTEMS ELECTRO-OPTICS ELOP LTD., Rehovot (IL)

(*) Notice: Subject to any disclaimer, the term of this patent is extended or adjusted under 35 U.S.C. 154(b) by 169 days.

(21) Appl. No.: 15/326,656

(22) PCT Filed: Jul. 19, 2015

(86) PCT No.: PCT/IL2015/050740
§ 371 (c)(1),
(2) Date: Jan. 17, 2017

(87) PCT Pub. No.: WO2016/009440
PCT Pub. Date: Jan. 21, 2016

(65) Prior Publication Data
US 2017/0205498 A1    Jul. 20, 2017

(30) Foreign Application Priority Data
Jul. 17, 2014   (IL) .......................................... 233692

(51) Int. Cl.
*G01S 7/48*      (2006.01)
*G01S 7/497*     (2006.01)
(Continued)

(52) U.S. Cl.
CPC .............. *G01S 7/4972* (2013.01); *G01S 7/40* (2013.01); *G01S 7/483* (2013.01); *G01S 7/4863* (2013.01);
(Continued)

(58) Field of Classification Search
None
See application file for complete search history.

(56) References Cited

U.S. PATENT DOCUMENTS 3,968,362 A * 7/1976 Mocker .................. G01F 1/661
250/216
4,600,305 A   7/1986 Priddy
(Continued)

FOREIGN PATENT DOCUMENTS

JP   S26104263    8/1981
WO   WO 9745835   12/1997

OTHER PUBLICATIONS

Search Report of International Application No. PCT/IL2015/050740, dated Nov. 9, 2015.
(Continued)

*Primary Examiner* — Hovhannes Baghdasaryan
(74) *Attorney, Agent, or Firm* — PEARL COHEN ZEDEK LATZER BARATZ LLP

(57) ABSTRACT

A system and method for analyzing quality criteria of a radiation spot are provided herein. The system may include: at least one controllable electromagnetic radiation source configured to generate and transmit a radiation beam onto an object, resulting in a radiation spot on said object; at least one radiation sensor configured to sense and obtain radiation reflections coming back from said object, wherein the radiation beam is generated in a way that reflections from different ranges are distinguishable of each other; and an analyzer configured to analyze said radiation reflections, and determine a remedy to the radiation beam, in a case that said radiation spot does not meet predefined spot validity criteria. The method may implement the aforementioned logic in a different architecture.

15 Claims, 7 Drawing Sheets

(51) Int. Cl.
*G01S 7/40* (2006.01)
*G01S 7/483* (2006.01)
*G01S 7/4863* (2020.01)
*F41G 3/32* (2006.01)
*F41G 3/14* (2006.01)

(52) U.S. Cl.
CPC .............. *G01S 7/497* (2013.01); *F41G 3/145* (2013.01); *F41G 3/32* (2013.01)

(56) References Cited

U.S. PATENT DOCUMENTS

| | | | |
|---|---|---|---|
| 4,737,028 A | 4/1988 | Smith | |
| 4,891,772 A * | 1/1990 | Case | G01S 7/4811 250/201.4 |
| 5,784,023 A * | 7/1998 | Bluege | G01S 7/4815 342/104 |
| 6,330,523 B1 | 12/2001 | Kacyra et al. | |
| 8,586,932 B2 | 11/2013 | Rousso et al. | |
| 8,797,828 B1 * | 8/2014 | Lev | G01V 8/00 356/486 |
| 2003/0030582 A1 * | 2/2003 | Vickers | G01S 17/023 342/54 |
| 2004/0012770 A1 * | 1/2004 | Stierle | G01B 13/20 356/4.01 |
| 2004/0130702 A1 * | 7/2004 | Jupp | G01S 7/497 356/5.01 |
| 2007/0058038 A1 | 3/2007 | David et al. | |
| 2010/0250189 A1 | 9/2010 | Brown | |
| 2013/0329211 A1 * | 12/2013 | McHale | G01C 15/002 356/4.01 |
| 2019/0324124 A1 * | 10/2019 | O'Keeffe | G01S 7/486 |

OTHER PUBLICATIONS

Supplementary European Search Report for EP patent application No. EP15822362.8, dated Apr. 26, 2018.
Office Action for Indian Patent Application No. 201737005588, dated Jul. 16, 2020.

* cited by examiner

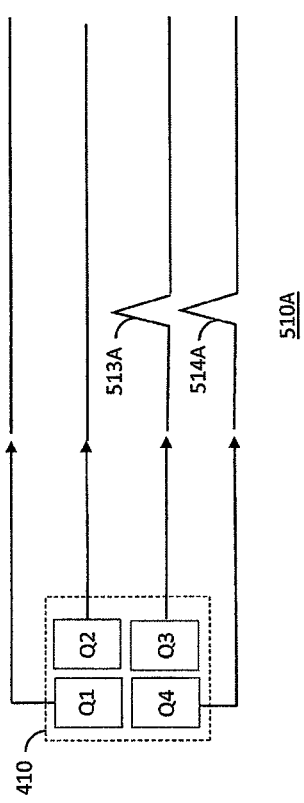
Figure 5A
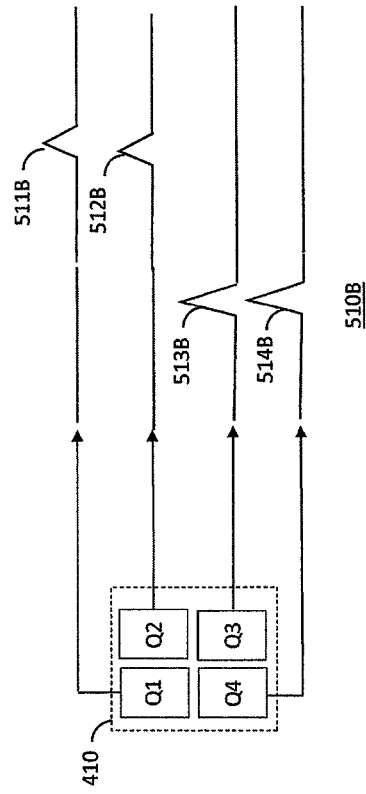
Figure 5B
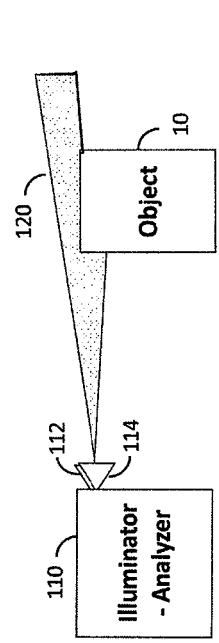
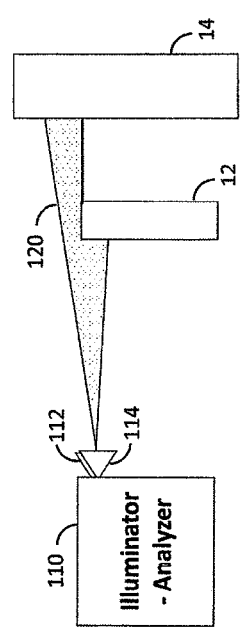

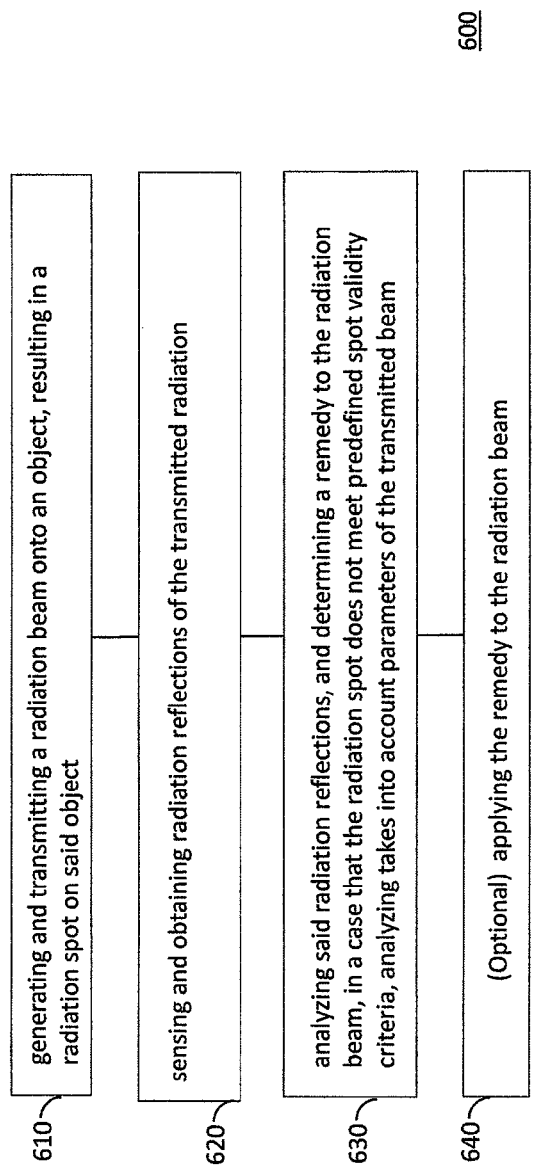

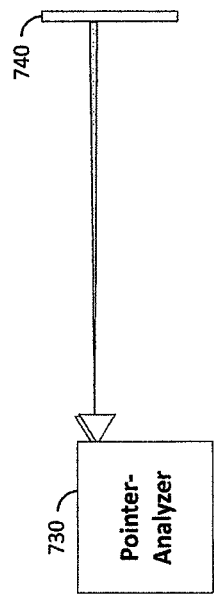
Figure 7B
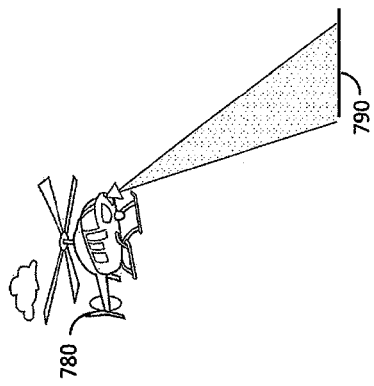
Figure 7D
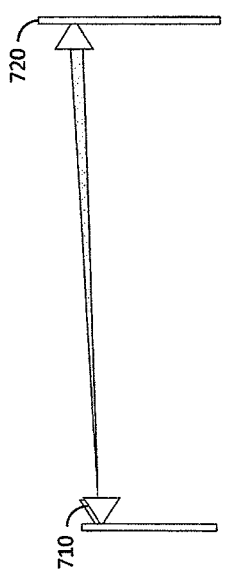
Figure 7A
Figure 7C

SYSTEM AND METHOD FOR ANALYZING QUALITY CRITERIA OF A RADIATION SPOT

CROSS-REFERENCE TO RELATED APPLICATIONS

This application is a National Phase Application of PCT International Application No. PCT/IL2015/050740, International Filing Date Jul. 19, 2015, entitled: "SYSTEM AND METHOD FOR ANALYZING QUALITY CRITERIA OF A RADIATION SPOT", published on Jan. 21, 2016 as International Patent Application Publication No. WO 2016/009440, claiming the benefit of Israel Patent Application No. 233692, filed Jul. 17, 2014, all of which are hereby incorporated by reference in their entireties.

FIELD OF THE INVENTION

The present invention relates generally to the field of illumination sources based on electromagnetic radiation, and more particularly to determining the validity of radiation spots generated by such sources.

BACKGROUND OF THE INVENTION

One challenge in producing an electromagnetic radiation spot generated by a one or more illumination sources (e.g., a laser or other radiating sources) is to ensure that the radiation spot transmitted onto a remote object meets predefined quality criteria such as, but not limited to: spot size, spot shape, overall energy applied to the illumination surface, energetic uniformity of the spot, and the alignment of the spot vis à vis the illuminated objet in the sense of borders, coverage and energy containment. The term "spot validity" as used herein relates to the level of compliance of a certain spot with the quality criteria mentioned above.

BRIEF SUMMARY OF THE INVENTION

According to one embodiment of the present invention, there is provided a system for analyzing quality criteria of a radiation spot. The system may include: at least one controllable electromagnetic radiation source configured to generate and transmit a radiation beam onto an object, resulting in a radiation spot on said object; at least one radiation sensor configured to sense and obtain radiation reflections coming back from said object, wherein the radiation beam is generated in a way that reflections from different ranges are distinguishable of each other; and an analyzer configured to analyze said radiation reflections, and determine a remedy to the radiation beam, in a case that said radiation spot does not meet predefined spot validity criteria. The analyzer may be further configured to determine for each sensed reflection, a time of arrival and at least one of: a location of arrival, an angle of arrival, and a magnitude of the reflection. The remedy is based on analyzing the aforementioned parameters or properties of the reflections.

According to one embodiment of the present invention, there is provided a method of analyzing quality criteria of a radiation spot. The method may include the followings steps: generating and transmitting a radiation beam onto an object, resulting in a radiation spot on said object; sensing and obtaining radiation reflections coming back from said object, wherein the radiation beam is generated in a way that reflections from different ranges are distinguishable of each other; and analyzing said radiation reflections, and determining a remedy to the radiation beam, in a case that said radiation spot does not meet predefined spot validity criteria These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIGS. 5A and 5B are diagrams illustrating further non-limiting example of an aspect of the system according to embodiments of the present invention;

FIG. 6 is a high level flowchart illustrating a method according to embodiments of the present invention; and FIGS. 7A-7D are diagrams illustrating further non-limiting examples the system according to embodiments of the present invention.

DETAILED DESCRIPTION OF THE INVENTION

Figure 1:
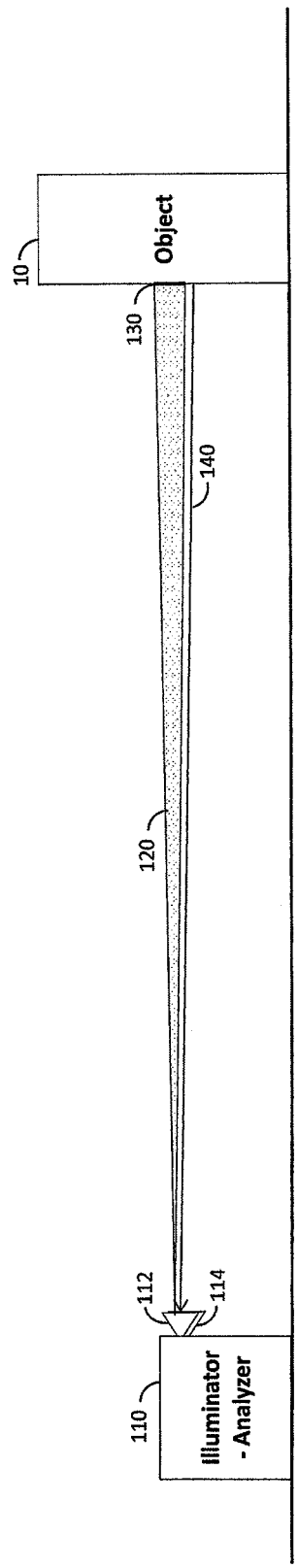
FIG. 1 is a block diagram illustrating a system according to some embodiments of the present invention.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a schematic block diagram illustrating a system according to some embodiments of the present invention. System 110 may include at least one controllable electromagnetic radiation source 112 configured to generate and transmit a radiation beam 120 onto an object 10, resulting in a radiation spot 130 on object 10. System 110 may further include at least one radiation sensor 114 configured to sense and obtain radiation reflections coming back from said object, wherein the radiation beam is generated in a way that reflections from different ranges are distinguishable of each other. System 110 may further include an analyzer configured to analyze said radiation reflections, and determine a remedy to the radiation beam, in a case that said radiation spot does not meet predefined spot validity criteria. The analyzer may be further configured to determine for each sensed reflection, a time of arrival and at least one of: a location of arrival, an angle of arrival, and a magnitude of the reflection.

Spot validity level may be a quantitative measure indicating how much different the spot is from a preferred spot based on specific metrics. Specifically, the level of uniformity of the radiation throughout the spot, number of objects covered by the beam as well as its shape and size (e.g. diameter d) are all metrics of the radiation spot when considered as an indicator for validity purposes. A radiation spot may be considered compliant or non-compliant with the spot validity criteria, based on various variables including the specific purpose or application for which the spot is used.

According to some embodiments of the present invention, the at least one controllable electromagnetic radiation source and the at least one radiation sensor are co-located and synchronized with each other.

According to some embodiments of the present invention the radiation beam is generated in a way that reflections from different ranges are distinguishable of each other by generating a pulsed and/or modulated radiation beam and by synchronizing the radiation sensor with the pulses and/or the modulation.

According to some embodiments of the present invention the analyzer is further configured to determine for each sensed reflection, a time of arrival and at least one of: a location of arrival, an angle of arrival, and a magnitude of the reflection.

According to some embodiments of the present invention the analyzer is configured to determine a deviation from said predefined spot validity criteria based on at least one of: the time of arrival, the location of arrival, and the angle of arrival of the reflections, and configured to determine the remedy further based on the magnitude of the reflections.

According to some embodiments of the present invention said predefined spot validity criteria comprise at least one of: shape of the radiation spot, size of the radiation spot, location of the radiation spot relative to boundaries of the object; and energy uniformity of the radiation spot.

According to some embodiments of the present invention the at least one radiation sensor is configured to sense and obtain radiation reflections coming back from objects located more than 10 km from the radiation sensor.

According to some embodiments of the present invention the at least one radiation sensor may have a dynamic range which is sufficient to sense and obtain radiation reflections coming back from objects located more than 10 km from the radiation sensor and also as close as 1 km from the radiation sensor.

According to some embodiments of the present invention the radiation sensor is further associated with a resolution level that is sufficiently high to distinguish between reflections coming from different objects which are located within 5 m from each other.

According to some embodiments of the present invention radiation sensor comprises at least two independent radiation sensing units, wherein said analyzer is configured to receive for each of the reflections, an association with the respective independent sensing unit, a time of arrival, and magnitude.

According to some embodiments of the present invention, further comprising at least one remedy module configured to receive the remedy from the analyzer and apply the remedy to the controllable electromagnetic radiation source.

According to some embodiments of the present invention further comprising a radiation manipulator configured to adjust radiation properties of the controllable electromagnetic radiation source, based on the remedy.

According to some embodiments of the present invention the controllable electromagnetic radiation source is a controllable light source configured to generate a light beam and wherein the system further comprises controllable optics configured to adjust the light source's alignment with the scene.

According to some embodiments of the present invention said controllable optics comprise a lens configured to move relative to an optical path of the light beam for spatially divert the light beam (e.g., along the optical path or perpendicularly to the optical path).

According to some embodiments, system 110 may further include a controller configured to control said radiation source based on the radiation adjustments generated by remedy module. According to some embodiments, system 110 may further include at least one drive/drives physically coupled to radiation source 110 and wherein controller may configured to instruct drive to adjust the spatial orientation and/or beam divergence of radiation source. In some embodiments, the spatial adjustments by motor may assist aligning radiation source with specified objet 10 so that an adequate level of energy is applied to specified objet 10 and that only a level of energy under a defined threshold is allowed not to be reflected back from specified objet 10 or even worse, reflected from a different object thus provide false reflections.

Figure 2:
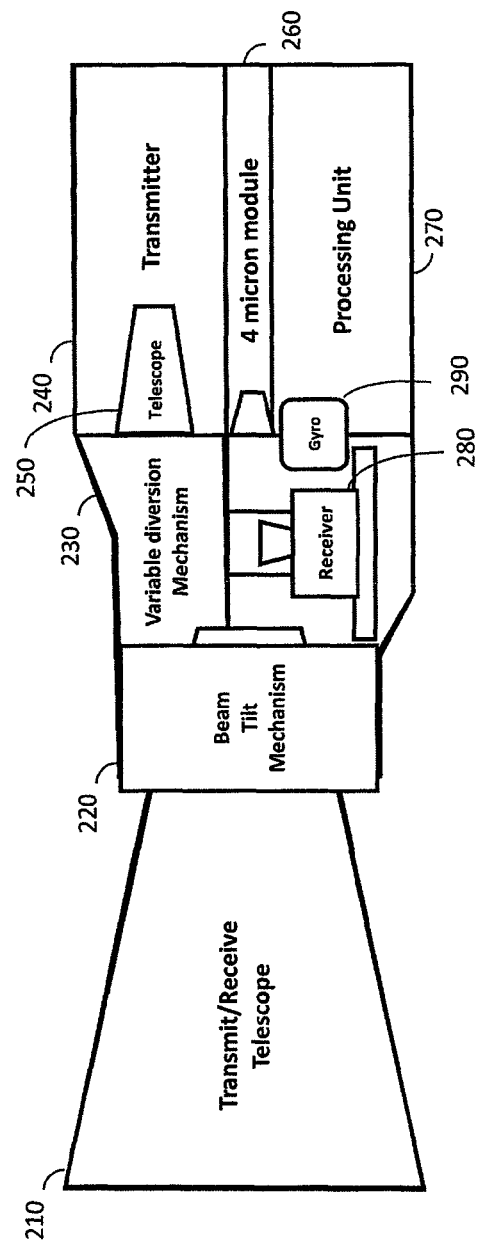
FIG. 2 is a detailed block diagram illustrating an aspect according to some embodiments of the present invention.

FIG. 2 is a diagram illustrating a non-limiting implementation of the system according to some embodiments of the present invention. A radiation transmitter 240 transmits radiation via telescope 250 and through variable divergence mechanism 230 and into beam tilting mechanism 220 and then via a transmitted/receiver telescope 210—into the scene and onto an object, creating a spot.

Reflections enter transmitted/receiver telescope 210 and folded onto receiver (sensor) 280 which is configured to derive pulses from the coming reflections and associate each pulse with a direction and time of arrival. These metrics are fed into a computer processor 270 (possibly in a form of an FPGA) which analyzes the pulses and determine the spot validity. Additionally computer processor 270 calculates the adjustments to the beam.

Optionally, some of the adjustments may be carried optically without moving the system, by controlling the beam properties by diverging and diverting it using for example a movable lens/lenses configured to move realtive to the optical path of the radiation beam. In another embodiment, adaptive optics may be used for adjusting optical properties of the beam (e.g., tilt angle, divergence) without introducing any moving part.

Tilting the system in its entirety is not necessary in embodiments in which the radiation source is configured to tilt the radiation beam optically (e.g., by diverging or diverting the beam) without any physical movement of the system or even the radiation source itself. In one embodiment, the entire system may be tilted mechanically so as to improve the alignment of the transmitted beam and the object.

According to some embodiments of the present invention, spot validity is calculated, inter alia, based on a temporal analysis of the reflections that originated from a single transmitted beam For example: two or more reflections which arrive to the sensor at different times indicate that the beam undesirably covers more than one object. The analysis may be detailed enough to indicate how this deviation can be remedied.

According to embodiment of the invention, the sensor need not move relative to the spot transmitted on the object. It is crucial that the radiation source will be adjusted so as to adjust the radiation spot on the object rather than adjusting the sensor to a given, uncontrolled spot on the object. Therefore, it would be irrelevant whether the spot is reflected onto the center of the sensor or onto its boundary. However, it would be advantageous for the radiation spot to be effectively at the center of the object having the spot transmitted thereon.

According to some embodiments, the sensor may require a very high dynamic range enabling it to detect both very low signals (reflections coming from afar) and high signal (reflection coming from very near range). As both the radiation source and sensor are located at the same place, the angular difference between them may be monitored and controlled.

According to some embodiments of the present invention, the aforementioned spatial and temporal analysis of the reflections may be achieved by using an array of sensors such as a matrix sensor. Alternatively, a plurality of discrete sensors may be used. For example, a four-quarter sensor may be used to monitor the reflections. By using an array of sensors, the reflections are associated with a spatial direction or location which may be used, by way of example, to determine a potential cause for a degraded level of spot validity such as inaccurate direction to the object or unfitted spot size.

Figures 3A, 3B:
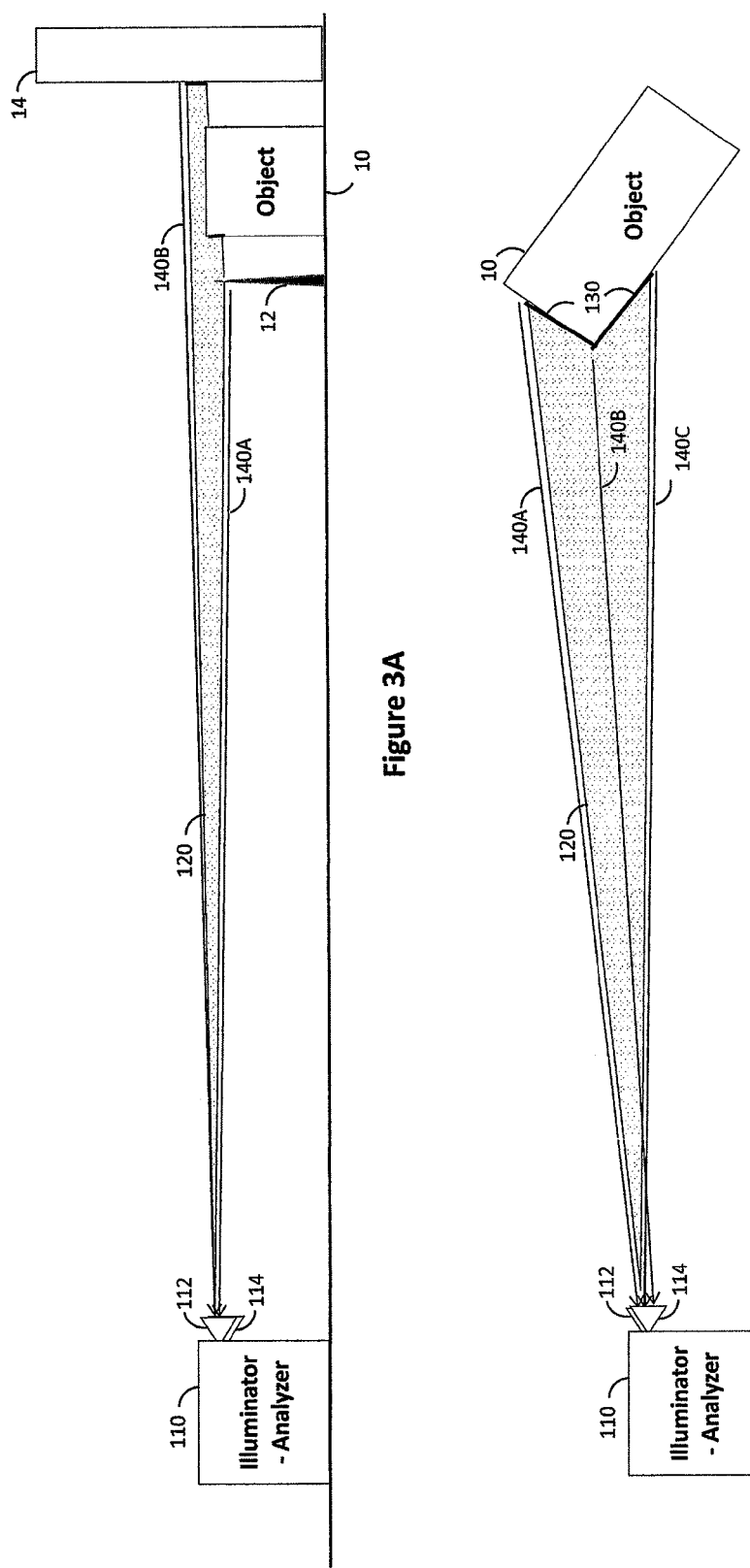
FIGS. 3A and 3B are block diagrams illustrating non-limiting example of an operation of the system according to embodiments of the present invention.

FIG. 3A is a diagram illustrating non-limiting example of an operation of the illuminator-analyzer 110 according to embodiments of the present invention. Here non-target objects 12 and 14 reflect some of the radiation of beam 120 indicating, by untimely pulses from reflections 140A and 140B that the target object 10 is not illuminated properly.

FIG. 3B is a diagram illustrating non-limiting example in which target object 10 is not well aligned causing again a non-valid spot. Specifically, illuminator-analyzer 110 generates a beam 120 resulting in a spot 130 on object 10. Since object 10 is tilted with respect to beam 120, the spot is spread irregularly over an irregular surface (e.g., a corner) of object 10 thus the reflections 140A-140C from same object 10 may be recovered received with a delay from each other which may indicate they are coming from different objects. A further analysis, however, would indicate that the spot is simply misaligned with a substantially regular surface on the target object and that the delay may be treated with realigning the beam 120 with target 10.

Figure 4C:
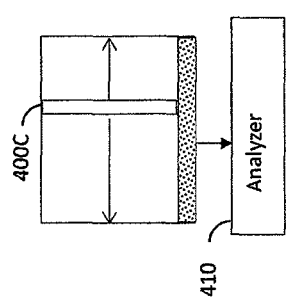
FIGS. 4A-4C are block diagrams illustrating further non-limiting example of an aspect of the system according to embodiments of the present invention.
Figure 4B:
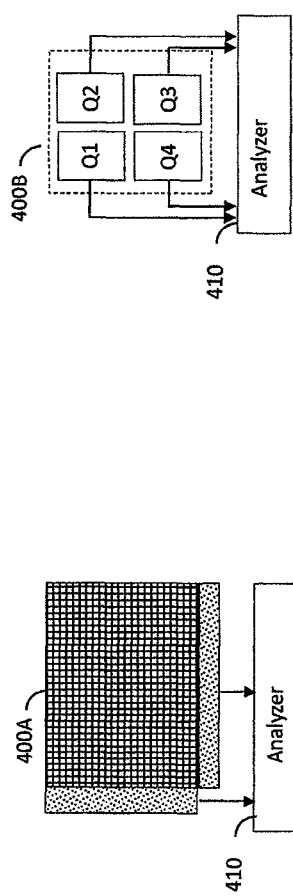
Figure 4A:
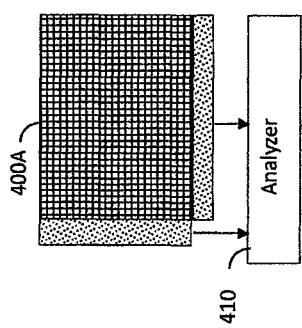

FIGS. 4A-4C are block diagrams illustrating three possible non-limiting sensor/receivers. FIG. 4A suggests a matrix detector 400A in which each element receives its own pulse and associates it with direction and time of arrival and then forwards the column by row data to analyzer 410. According to some embodiments of the present invention the at least two independent radiation sensing units, form an array sensor configured to generate a matrix indicative of time of arrivals and magnitudes of the respective reflections.

FIG. 4B is a simpler detector 400B based on discrete detectors, possibly each for a quarter of the image. According to some embodiments of the present invention the at least two independent radiation sensing units Q1-Q2-Q3-Q4, form a four-quadrant sensor, wherein each of the sensing units in the four-quadrant is a discrete sensing unit connected separately to analyzer 410.

FIG. 4C is a scanner detector 400C which may require analyzing the spot in a series of several scanning cycles. This will require addressing a potential error and latency in taking a decision regarding remedying the spot. Alternatively, the scanning sensor may be required to be sufficiently quick to collect all pulses of same time of arrival and detect difference between them. According to some embodiments of the present invention radiation sensor may be a scanning sensor comprising a single sensing unit configured to scan in accordance with a scanning pattern that is synchronized with the electromagnetic radiation source so as to enable correction of tempo-spatially misalignment of the reflections due to the scanning. In one embodiment, the sensor is a scanning line sensor having a vector that scans one axis to yield matrix coverage.

FIGS. 5A and 5B are diagrams illustrating further non-limiting example of an aspect of the system according to embodiments of the present invention. Specifically, the implemented sensor discussed is a four-quadrant sensor which assigns a reflection with each of its quadrant Q1-Q4.

FIG. 5A shows on the left side, a set-up of an illuminator analyzer 110 directing a beam 120 via illuminator 112 at an object 10. As can be seen some part of beam 120 misses object 10 and therefore only some of the beam is being back reflected to be detected by sensor 114. The reflections as a function of time are shown in the pulse diagrams 510A where pulses associate with an exemplary four quadrant sensor 410 having four discrete sensor Q1-Q4 are shown, In graph 510A pulses 513A and 514A indicate the reflections from object 10 as detected by lower sensor units Q3 and Q4. The upper sensors Q1 and Q2 did not detect any pulse since the beam missed the object at its upper side. Analyzing the magnitudes of the pulses (or lack thereof) will enable the analyzer to deduce that the spot has partially missed the object.

FIG. 5B shows on the left side, a set-up of an illuminator analyzer producing a beam 120 via illuminator 112 which is split into two objects—object 12 being the object of interest and object 14 is in this case an object which leads to irrelevant pulses. This can be shown in the pulse diagrams 510B where it is evident that while Q3 and Q4 exhibit pulses 513A and 514A being the reflections from object 10, pulses 511B and 511A present different magnitudes and a delay which can be analyzed (together with the magnitude) for recommending a suggested remedy.

FIG. 6 is a high level flowchart illustrating a method 600 according to embodiments of the present invention. Method 600 may include the following steps: generating and transmitting a radiation beam onto an object, resulting in a radiation spot on said object 610; sensing and obtaining radiation reflections coming back from said object, wherein the radiation beam is generated in a way that reflections from different ranges are distinguishable of each other 620; and analyzing said radiation reflections, and determining a remedy to the radiation beam, in a case that said radiation spot does not meet predefined spot validity criteria 630.

According to some embodiments of the present invention the generation step 610 and the sensing step 620 may be carried out at the same location (co-located). Additionally the generation parameters of step 610 are known and used in the analyzing step 630 for improving the analysis of the spot quality.

According to some embodiments of the present invention the radiation beam may be generated in a way that reflections from different ranges are distinguishable of each other. This may be achieved, without limiting to a specific structure or implementation, by generating a pulsed and/or modulated radiation beam and by timing the radiation sensor with the pulses and/or the modulation. One measurement may be time-of-flight applied to the returning pulses so as to distinguish the range of their origin.

According to some embodiments of the present invention the sensing step 620 may further include determining for each sensed reflection, a time of arrival and at least one of: a location of arrival, an angle of arrival, and a magnitude of the reflection.

According to some embodiments of the present invention the analyzing further comprises determining a deviation from said predefined spot validity criteria based on at least one of: the time of arrival, the location of arrival, and the angle of arrival of the reflections, and configured to determine the remedy further based on the magnitude of the reflections.

According to some embodiments of the present invention the method may further include an optional step of actually applying the remedy that has been determined, to the electromagnetic radiation 640 thus achieving a valid spot.

FIGS. 7A-7D are diagrams illustrating further non-limiting examples the system according to embodiments of the present invention. It is understood that many other applications may be implementing embodiments of the present invention.

FIG. 7A is a block diagram according to some embodiments of the present invention in which radiation source 710 is a radio frequency (RF) source such as a directional antenna and wherein the system is incorporated within a communication system or a radar system. Specifically, directional antenna can be used to focus an RF beam at an antenna-receiver 720. A beam adjustment process may repeatedly analyze and improve the quality of the beam by analyzing the reflections coming from antenna 720. In radar applications, the coverage, as well as the uniformity of the beam can me monitored.

FIG. 7B is a block diagram according to some embodiments of the present invention in which radiation source 710 is a laser source (pointer analyzer) configured to generate a laser beam which may be transmitted onto a target 740. This way, the system may be incorporated within a laser pointing system in which the quality of the laser indicator is monitored. Alternatively the laser beam may be used for speckle pattern analysis for remote sensing and seismic sensing applications.

FIG. 7C is a block diagram according to some embodiments of the present invention in which radiation source 750 may be a visible light beam projector configured to generate a light beam generating a spot 770 on the ground. As shown the projector is connected to a watch tower 750 and another projector is connected to watch tower 760. Both projectors may operate together; each projector may be configured to analyze each other's spot by receiving the other projector's reflection sand analyzing them.

FIG. 7D is a block diagram according to some embodiments of the present invention in which radiation source 710 may be a visible light beam projector configured to generate a light beam. As shown the projector is connected to a helicopter 780 illuminating a spot 790 over the ground, for searching purposes. In other examples, system may be incorporated within an illumination system, used for homeland security and other controlled illuminating purposes.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system for analyzing quality criteria of a light spot, the system comprising:
   at least one controllable light source configured to generate and transmit a light beam onto an object, resulting in a light spot on the object;
   at least one light sensor configured to sense and obtain light reflections coming back from said object, wherein the light beam is generated in a way that reflections from different ranges are distinguishable of each other;
   an analyzer configured to analyze said light reflections, and determine a remedy to the light beam, in a case that said light spot does not meet predefined spot validity criteria,
   wherein the analyzer is further configured to determine for each sensed reflection, a time of arrival and at least one of: a location of arrival at said sensor, an angle of arrival, and a magnitude of the reflection,
   wherein the analyzer is further configured to calculate a spot validity level of the light spot, being a quantitative measure indicating how much different the spot is from a preferred light spot based on specific metrics comprising at least one of: a number of objects covered by the light beam, and borders of the light spot relative to the object, and
   wherein the remedy to the light beam comprises instructions how to adjust the spatial orientation and/or beam divergence of the controllable light source, to meet the predefined spot validity criteria.

2. The system according to claim 1, wherein the at least one controllable electromagnetic light source and the at least one radiation sensor are co-located and synchronized with each other.

3. The system according to claim 1, wherein the analyzer is further configured to determine a deviation from said predefined spot validity criteria based on an angle of arrival of the light reflections.

4. The system according to claim 1, wherein said predefined spot validity criteria comprise at least one of: shape of the light spot, size of the light spot, location of the light spot relative to boundaries of the object; and energy uniformity of the light spot.

5. The system according to claim 1 wherein the at least one radiation sensor is configured to sense and obtain light reflections coming back from objects located more than 10 km from the radiation sensor.

6. The system according to claim 1, wherein the at least one radiation sensor is configured to sense and obtain light reflections coming back from objects located along a range from 1 km to over 10 km from the radiation sensor.

7. The system, according to claim 6, wherein the radiation sensor is one of: a matrix sensor, a four-quadrant sensor, a scanning line sensor, and a masked sensor.

8. The system according to claim 1, wherein the at least one radiation sensor has a dynamic range which is sufficient to sense and obtain light reflections coming back from objects located more than 10 km from the radiation sensor and further to distinguish between light reflections coming from different object which are located within 5 m or less from each other.

9. The system according to claim 1, wherein said radiation sensor comprises at least two independent radiation sensing units, wherein said analyzer is configured to receive for each of the light reflections, an association with the respective independent radiation sensing unit, a time of arrival, and magnitude.

10. The system according to claim 1, further comprising a radiation manipulator configured to adjust radiation properties of the controllable electromagnetic light source, based on the remedy generated by the analyzer.

11. The system according to claim 1, wherein the controllable electromagnetic light source further comprises controllable optics configured to adjust the controllable electromagnetic light source's alignment with the scene.

12. The system according to claim 11, wherein said controllable optics comprise a lens configured to move relative to an optical path of the pulsed light beam for spatially divert the pulsed light beam.

13. The system according to claim 12, wherein said lens is configured to move along the optical path of the pulsed light beam.

14. The system according to claim 1, wherein the controllable electromagnetic light source is a laser source configured to generate a pulsed laser beam and wherein the system is incorporated within a laser system.

15. The system according to claim 1, wherein the controllable electromagnetic light source is a nonlaser visible light beam projector configured to generate a pulsed light beam and wherein the system is incorporated within an illumination system.

* * * * *